(12) United States Patent
Lefebvre et al.

(10) Patent No.: US 10,943,389 B2
(45) Date of Patent: Mar. 9, 2021

(54) REMOVING OR IDENTIFYING OVERLAPPING FRAGMENTS AFTER Z-CULLING

(71) Applicants: Advanced Micro Devices, Inc., Sunnyvale, CA (US); ATI Technologies ULC, Markham (CA)

(72) Inventors: Laurent Lefebvre, Markham (CA); Michael Mantor, Orlando, FL (US); Mark Fowler, Boxborough, MA (US); Mikko Alho, Kokemäki (FI); Mika Tuomi, Noormarkku (FI); Kiia Kallio, Inkoo As (FI); Patrick Klas Rudolf Buss, Lappohja (FI); Jari Antero Komppa, Karjaa (FI); Kaj Tuomi, Noormarkku (FI); Christopher J. Brennan, Boxborough, MA (US)

(73) Assignees: Advanced Micro Devices, Inc., Sunnyvale, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 15/374,752

(22) Filed: Dec. 9, 2016

(65) Prior Publication Data
US 2018/0165872 A1    Jun. 14, 2018

(51) Int. Cl.
*G06T 1/20* (2006.01)
*G06T 15/00* (2011.01)
(Continued)

(52) U.S. Cl.
CPC ............ *G06T 15/405* (2013.01); *G06T 11/40* (2013.01); *G06T 15/005* (2013.01); *G06T 15/80* (2013.01)

(58) Field of Classification Search
CPC .......... G06T 1/20; G06T 15/00; G06T 15/405
See application file for complete search history.

(56) References Cited

U.S. PATENT DOCUMENTS

| | | |
|---|---|---|
| 7,804,499 B1 | 9/2010 | Molnar et al. |
| 2007/0257905 A1* | 11/2007 | French ................ G06T 15/005 345/419 |

(Continued)

OTHER PUBLICATIONS

Aila, "Delay Streams for Graphics Hardware" ACM Transactions on Graphics Hardware, ACM Transactions on Graphics (TOG), ACM, US, vol. 22, No. 3, Jul. 1, 2003, pp. 792-800.

(Continued)

*Primary Examiner* — Yi Yang
(74) *Attorney, Agent, or Firm* — Volpe Koenig (57) ABSTRACT

Techniques for removing or identifying overlapping fragments in a fragment stream after z-culling are disclosed. The techniques include maintaining a first-in-first-out buffer that stores post-z-cull fragments. Each time a new fragment is received at the buffer, the screen position of the fragment is checked against all other fragments in the buffer. If the screen position of the fragment matches the screen position of a fragment in the buffer, then the fragment in the buffer is removed or marked as overlapping. If the screen position of the fragment does not match the screen position of any fragment in the buffer, then no modification is performed to fragments already in the buffer. In either case, he fragment is added to the buffer. The contents of the buffer are transmitted to the pixel shader for pixel shading at a later time.

19 Claims, 7 Drawing Sheets

(51) Int. Cl.
*G06T 15/40* (2011.01)
*G06T 11/40* (2006.01)
*G06T 15/80* (2011.01)

(56) References Cited

U.S. PATENT DOCUMENTS

| | | | | |
|---|---|---|---|---|
| 2008/0094395 | A1* | 4/2008 | Woo | G06T 15/405 |
| | | | | 345/422 |
| 2010/0007662 | A1* | 1/2010 | Cox | G06T 15/40 |
| | | | | 345/420 |
| 2011/0080406 | A1* | 4/2011 | Hakura | G06T 15/50 |
| | | | | 345/426 |
| 2012/0269422 | A1* | 10/2012 | Inazumi | B25J 9/1676 |
| | | | | 382/153 |
| 2014/0168220 | A1 | 6/2014 | Nystad et al. | |
| 2014/0176544 | A1* | 6/2014 | Fishwick | G06T 15/10 |
| | | | | 345/423 |
| 2014/0292756 | A1* | 10/2014 | Mantor | G06T 15/005 |
| | | | | 345/426 |
| 2015/0287231 | A1 | 10/2015 | Berghoff | |

OTHER PUBLICATIONS

Kuo et al., "The Design of LLVM-Based Shader Compiler for Embedded Architecture", Dec. 16, 2014, pp. 961-968.
Roca et al., "Workload Characterization of 3D Games", Oct. 1, 2006, pp. 17-26.
Tomas Akenine-Möller et al., "Real-Time Rendering, Third Edition", 2008, pp. 22-25, 670-682 and 856-859.

\* cited by examiner

REMOVING OR IDENTIFYING OVERLAPPING FRAGMENTS AFTER Z-CULLING

TECHNICAL FIELD

The disclosed embodiments are generally directed to graphics processing, and, in particular, to removing occluded fragments after z-culling.

BACKGROUND

Hardware for rendering three-dimensional graphics accepts input that specifies primitives to be drawn to a screen, converts that input into triangles, and processes the triangles to generate colors for display on a screen. This process includes pixel shading, which is the process of determining colors for pixels. Pixel shading typically involves at least some "overdraw," which occurs when the pixel shader unnecessarily calculates more than one color for a particular pixel, when only one color is eventually used. Overdraw can occur, for example, when two triangles overlap in screen space. In such a situation, the pixel shader may determine a first color for a pixel within the first triangle and then determine a second color for the same pixel within the second triangle. Only one such pixel can be used, so one of the determined color values is discarded. Reducing overdraw is an important aspect of improving performance of graphics processing hardware.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to techniques for removing or identifying overlapping fragments in a fragment stream after z-culling has completed. The techniques include maintaining a first-in-first-out ("FIFO") buffer that stores post-z-cull fragments. Each time a new fragment is received at the buffer, the screen position of the fragment is checked against all other fragments in the buffer. If the screen position of the fragment matches the screen position of a fragment in the buffer, then the fragment in the buffer is removed or marked as overlapping. If the screen position of the fragment does not match the screen position of any fragment in the buffer, then no modification is performed to fragments already in the buffer. In either case, he fragment is added to the buffer. The contents of the buffer are transmitted to the pixel shader for pixel shading at a later time.

Figure 1:
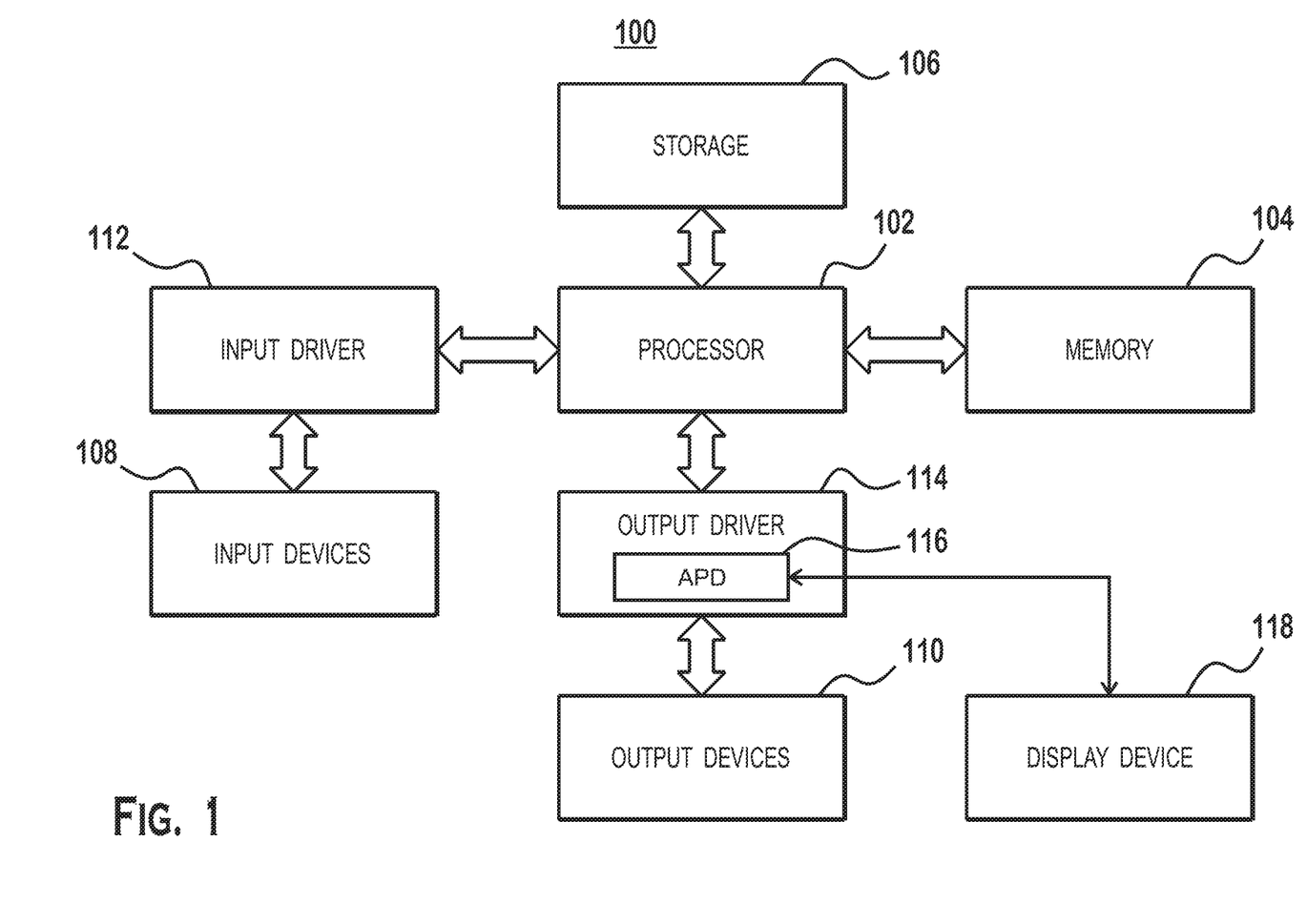
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also includes input drivers 112 and output drivers 114 that drive input devices 108 and output devices 110, respectively. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input drivers 112 communicate with the processor 102 and the input devices 108, and permit the processor 102 to receive input from the input devices 108. The output drivers 114 communicate with the processor 102 and the output devices 110, and permit the processor 102 to send output to the output devices 110. The output drivers 114 include an accelerated processing device (APD) 116 which is coupled to a display device 118. The APD 116 is configured to accept compute commands and graphics rendering commands from processor 102, to process those compute and graphics rendering commands, and to provide pixel output to display device 118 for display.

The APD 116 includes one or more parallel processing units configured to perform computations in accordance with a single-instruction-multiple-data ("SIMD") paradigm. However, functionality described as being performed by the APD 116 may also be performed by processing devices that do not process data in accordance with a SIMD paradigm.

Figure 2:
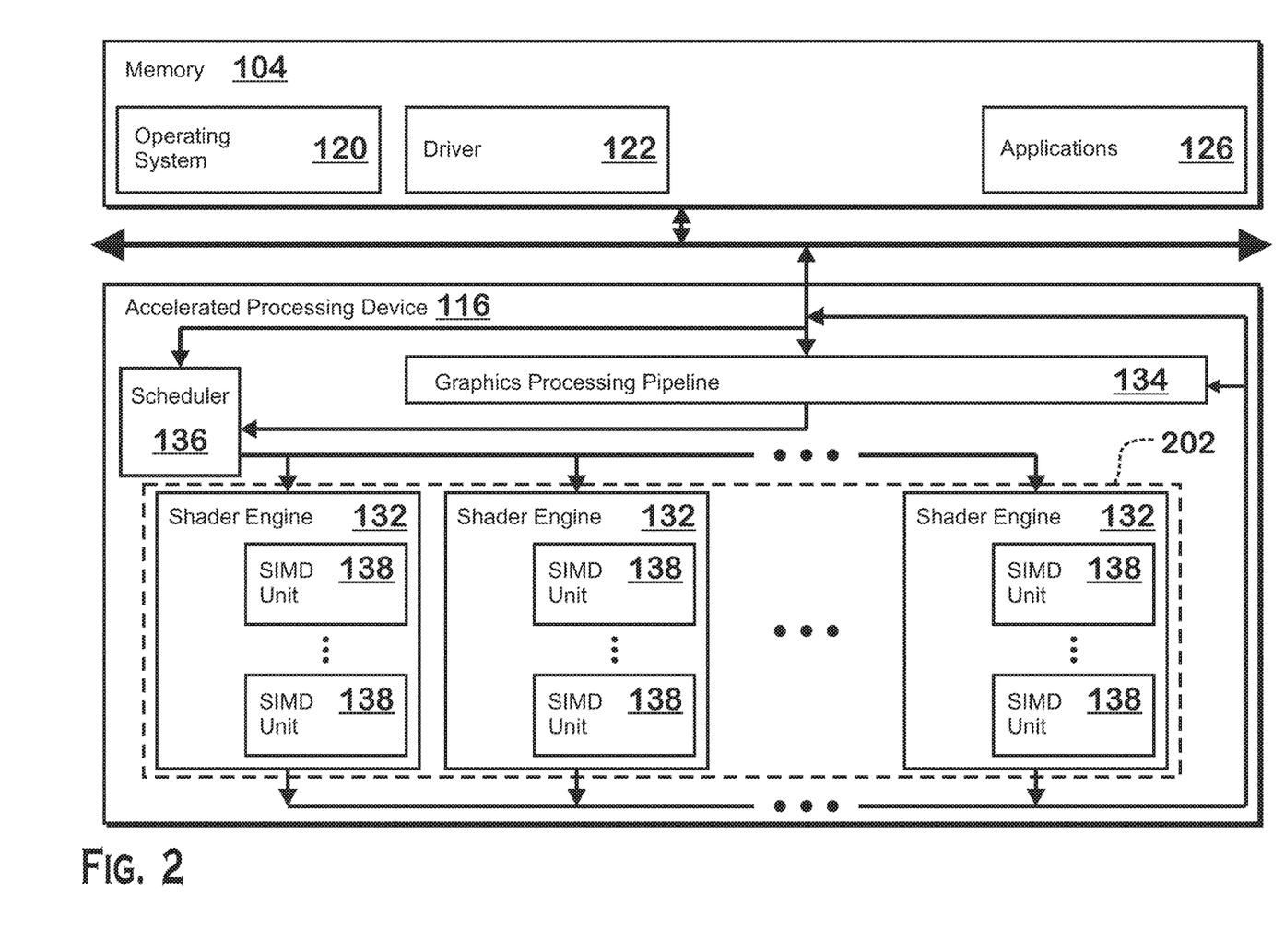
FIG. 2 is a block diagram of an accelerated processing device, according to an example.

FIG. 2 is a block diagram of an accelerated processing device 116, according to an example. The processor 102 maintains, in system memory 104, one or more control logic modules for execution by the processor 102. The control logic modules include an operating system 120, a driver 122, and applications 126. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related (or not related) to graphics operations, such as operations related to video, physics simulations, computational fluid dynamics, or other tasks, based on commands that are received from the processor 102 or that are not part of the "normal" information flow of a graphics processing pipeline 134.

The APD 116 includes shader engines 132 (which may collectively be referred to herein as "programmable processing units 202") that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in shader engines 132 is a work-item. Each work-item represents a single instantiation of a program that is to be executed in parallel in a particular lane. Work-items can be executed simultaneously as a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different shader engines 132 and SIMD units 138. Scheduling involves assigning wavefronts for execution on SIMD units 138, determining when wavefronts have ended, determining when wavefronts have stalled and should be swapped out with other wavefronts, and performing other scheduling tasks.

The parallelism afforded by the shader engines 132 is suitable for graphics related operations such as pixel value calculations, vertex transformations, and other graphics operations. A graphics processing pipeline 134 which accepts graphics processing commands from the processor 102 thus provides computation tasks to the shader engines 132 for execution in parallel.

The shader engines 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs") that define such computation tasks to the APD 116 for execution.

Figure 3:
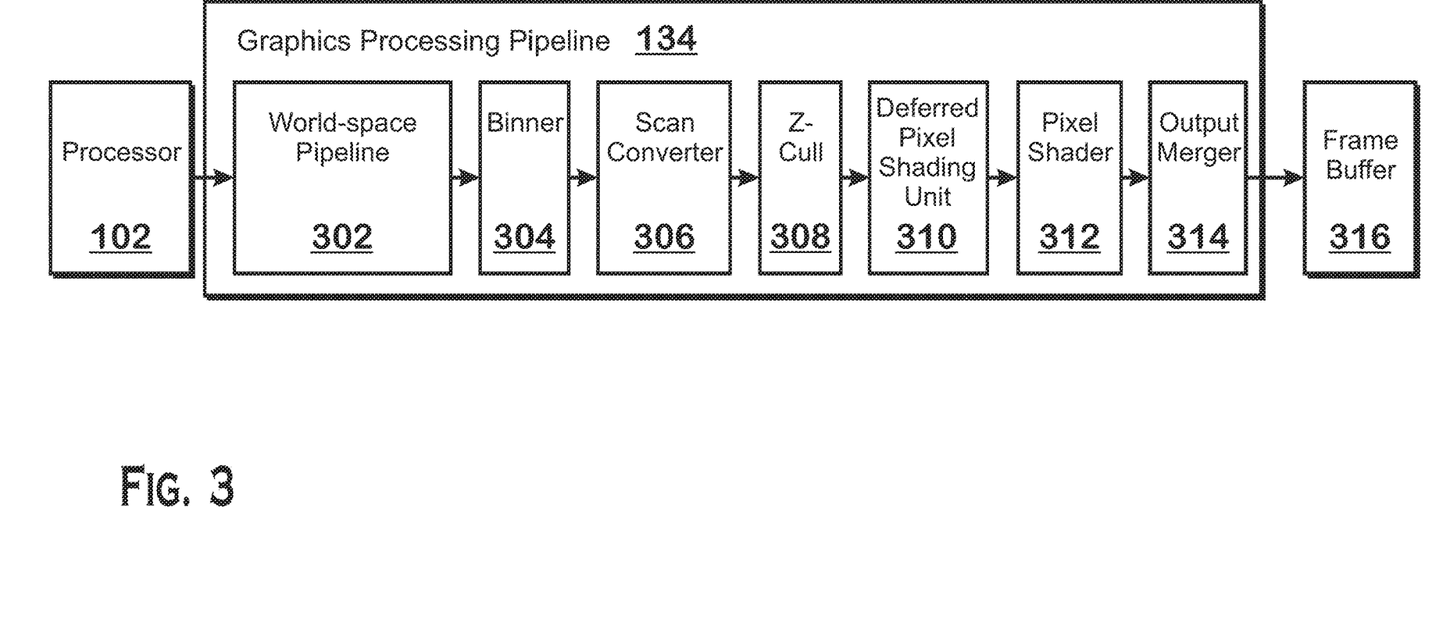
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes a world-space pipeline 302, a binner 304, a scan converter 306, a z-cull unit 308, a deferred pixel shading unit 310, a pixel shader 312, and an output merger 314. The output merger 314 outputs pixel data to a frame buffer 316, which stores data for display on the display device 118. The frame buffer can be used for purposes other than displaying data on the display device 118.

The world-space pipeline 302 performs vertex and primitive manipulation, converting objects defined in three-dimensional world-space to triangles defined in screen space. The world-space pipeline 302 reads primitive data from user-filled buffers (e.g., buffers filled at the request of software executed by the processor 102, such as an application 126) and assembles the data into primitives for use by the remainder of the pipeline. The world-space pipeline 302 performs functionality for converting the input received from a processor 102 into a form more amenable to rendering into screen pixels. More specifically, the world-space pipeline 302 performs vertex shading functions, optional tessellation functions if tessellation is enabled, and optional geometry shading functions if geometry shading is enabled.

Vertex shading includes performing various per-vertex operations such as transformations, skinning, morphing, and per-vertex lighting. Transformation operations may include various operations to transform the coordinates of the vertices. These operations may include one or more of modeling transformations, viewing transformations, projection transformations, perspective division, and viewport transformations. Herein, such transformations are considered to modify the coordinates or "position" of the vertices on which the transforms are performed. Other operations of vertex shading may modify attributes other than the coordinates. Vertex shading is implemented partially or fully as vertex shader programs to be executed on one or more shader engines 132. In some examples, the vertex shader programs are provided by the processor 102 and are based on programs that are pre-written by a computer programmer. The driver 122 compiles such programs to generate the vertex shader programs having a format suitable for execution within the shader engines 132. In other examples, the vertex shader programs are provided by the driver 122 directly, are retrieved from a memory of the APD 116 itself, or are provided through any other technically feasible means.

Tessellation converts simple primitives into more complex primitives by subdividing the primitives. Tessellation involves generating a patch for the tessellation based on an input primitive, generating a set of samples for the patch, and calculating vertex positions for the vertices corresponding to the samples for the patch. Tessellation can be performed partially or fully by shader programs executed on the programmable processing units 202.

Geometry shading performs vertex operations on a primitive-by-primitive basis. A variety of different types of operations can be performed via geometry shading, including operations such as point sprite expansion, dynamic particle system operations, fur-fin generation, shadow volume generation, single pass render-to-cubemap, per-primitive material swapping, and per-primitive material setup. Operations for geometry shading may be performed by a shader program that executes on the programmable processing units 202.

The world-space pipeline 302 can be implemented as a combination of hardware (including fixed function and programmable hardware) and software, as all hardware (including all fixed function hardware, all programmable hardware, or a combination thereof), or entirely as software executing on a hardware processor. The world-space pipeline 302 outputs primitives (typically triangles) for processing by other units in the graphics processing pipeline 134 for eventual conversion to screen-pixels to be written to a frame buffer 316 and output to a display device 118.

A binner 304, which is optional, accepts primitives from the world-space pipeline 302 and assigns each primitive to one or more "bins." A bin is a logical grouping of pixel data associated with a particular subdivision of screen space. For instance, one bin might encompass a group of pixel data for the top-let corner of screen space (for example, the top 64×64 pixels of screen space). The binner 304 fills bins until a particular trigger condition is met and then transmits the bins, in order, to the scan converter 306 for processing. The purpose of binning is to allow later units in the graphics processing pipeline 134 to process pixels in a "focused" manner, in terms of the portion of the screen that is processed at any given time. This "focusing" aims to reduce the amount of working data that is to be maintained during any particular portion of processing, which allows caches or buffers to be smaller and/or to be more efficiently used (e.g., by having higher hit rates, or the like). For example, by sending data associated with the top left corner of a screen before sending any other data, buffers and caches that store data associated with the top left corner will have data only for that to left corner of the screen. This would allow for such buffers or caches to be smaller and/or to have a higher hit rate. An example of operation of the binner 304 is provided below with respect to FIG. 4. Additional details regarding binner operations are provided in U.S. patent application Ser. No. 13/853,422, filed on Mar. 29, 2013, and entitled "Hybrid Render with Deferred Primitive Batch Binning," and in U.S. patent application Ser. No. 15/250,357, filed on Aug. 29, 2016, and entitled "Hybrid Render with Preferred Primitive Batch Binning and Sorting," both of which are incorporated herein by reference in their entirety.

The scan converter 306 receives primitives from the binner 304 and performs rasterization on those primitives. Rasterization involves determining which screen pixels (or sub-pixel samples for modes in which multiple color value samples are generated per screen pixel, for purposes such as anti-aliasing) are covered by a particular primitive. It should be understood that the term "pixel" may be substituted with "sub-pixel sample" herein. A sub-pixel sample is a portion of screen space that is smaller than a pixel in situations where multiple samples are generated for each pixel. For example, an anti-aliasing algorithm may utilize multiple samples per pixel in order to reduce the apparent abruptness of edges.

The scan converter 306 generates and outputs "fragments," which are unfinished descriptions of data for a particular pixel. Fragments travel through the remainder of the graphics processing pipeline 134 and are processed to identify color, and possibly other values, for the fragment. Fragments may be culled due to depth testing or for other reasons, or may survive and be written to the frame buffer 316 as a color value for display on the display device 118. The scan converter 306 may group multiple fragments into "quads," which are 2×2 groups of fragments that are contiguous in screen space, and are output from the scan converter 306. Each quad may correspond to a quad address that uniquely defines the position of the quad in screen space. For example, if a quad is a group of 2×2 fragments, then the quad address may be the screen position of the fragment in the quad that has even x and y screen positions, divided by two. In one example, a quad has four fragments with screen positions [0, 0], [1, 0], [0, 1], and [1,1]. The quad address for this quad would be the coordinates of the fragment having even-numbered screen positions (0, 0), divided by 2 (0,0). For a quad having four fragments with screen positions [10, 8], [11, 8], [10, 9], [11, 9], the quad address would be the screen position of the fragment having both even numbered pixel coordinates ([10,8]), with both coordinates divided by 2 ([5, 4]). Each quad includes a coverage map that indicates which fragments in the quad are covered by a primitive and which are not. For example, rasterization may determine that a primitive covers three of four fragments of a particular quad. The coverage map for that quad would indicate that the three covered fragments are covered and the remaining one fragment is not covered.

The z-cull unit 308 discards fragments that are determined to be occluded by already-seen fragments, as determined by the depth values of the later-seen fragments and the already-seen fragments. Accumulated depth data is reset each frame. In one example, for a particular screen position for which no fragments have been processed by the z-cull unit 308 for the current frame, the z-cull unit 308 receives a first fragment having a depth of 5, then a second fragment having a depth of 8, then a third fragment having a depth of 2. The z-cull unit 308 does not discard the first fragment, as no depth data yet exists for that screen location. However, the depth value for the second fragment indicates that that fragment is farther from the camera than the first fragment (e.g., the depth of 8 is higher than the depth of 5), so the z-cull unit 308 discards the second fragment. The z-cull unit 308 does not discard the third fragment, because that fragment, having depth value of 2, is closer than the other closest fragment, which has a depth value of 5. The z-cull unit 308 also updates the depth value for the screen location to 2 for processing of later-seen fragments. For processing of quads, discarding a fragment may include modifying coverage maps for the quads and may include discarding an entire quad if no fragments are visible after the coverage map for the quad is updated.

The deferred pixel shading unit 310 holds fragments received from the z-cull unit 308 to test the fragments against newer fragments that would overwrite the held fragments. This testing is performed to reduce the number of fragments that are to be processed by the pixel shader 312. Returning to the example three fragments discussed with respect to the z-cull unit 308, out of the three fragments processed by the z-cull unit 308, only the third fragment will eventually be visible, because that fragment is the closest to the camera and thus would occlude the other two fragments. However, the z-cull unit 308 passes both the first fragment, having depth 5, as well as the third fragment, having depth 2. To prevent the first fragment, which would not be visible in the final scene, from being processed by the pixel shader 312, the deferred pixel shading unit 310 further process fragments to remove at least some of the fragments passed by the z-cull unit 308 that would nonetheless be occluded by later-seen fragments. Details relating to operation of the deferred pixel shading unit 310 are provided at least in FIGS. 6 and 7 and in the related disclosure.

The pixel shader 312 implements pixel shading. Pixel shading involves determining values (such as color, or the like) for fragments based on primitives generated in the world-space pipeline 302 and the results of rasterization and z-culling. Pixel shading may include applying textures from a texture memory, applying shading algorithms, and/or applying other operations. Operations for pixel shading may be performed by one or more shader programs that execute on the programmable processing units 202.

The output merger 314 processes the fragments received from the pixel shader 312 for output to a frame buffer 316. The frame buffer stores pixel data for output to a display device 118 or for other purposes.

Each of the world-space pipeline 302, the binner 304, the scan converter 306, the z-cull unit 308, the deferred pixel shading unit 310, the pixel shader 312, and the output merger 314 can be implemented as a combination of hardware (including fixed function and programmable hardware) and software, as all hardware (including all fixed function hardware, all programmable hardware, or a combination thereof), or entirely as software executing on a hardware processor.

Figure 4:
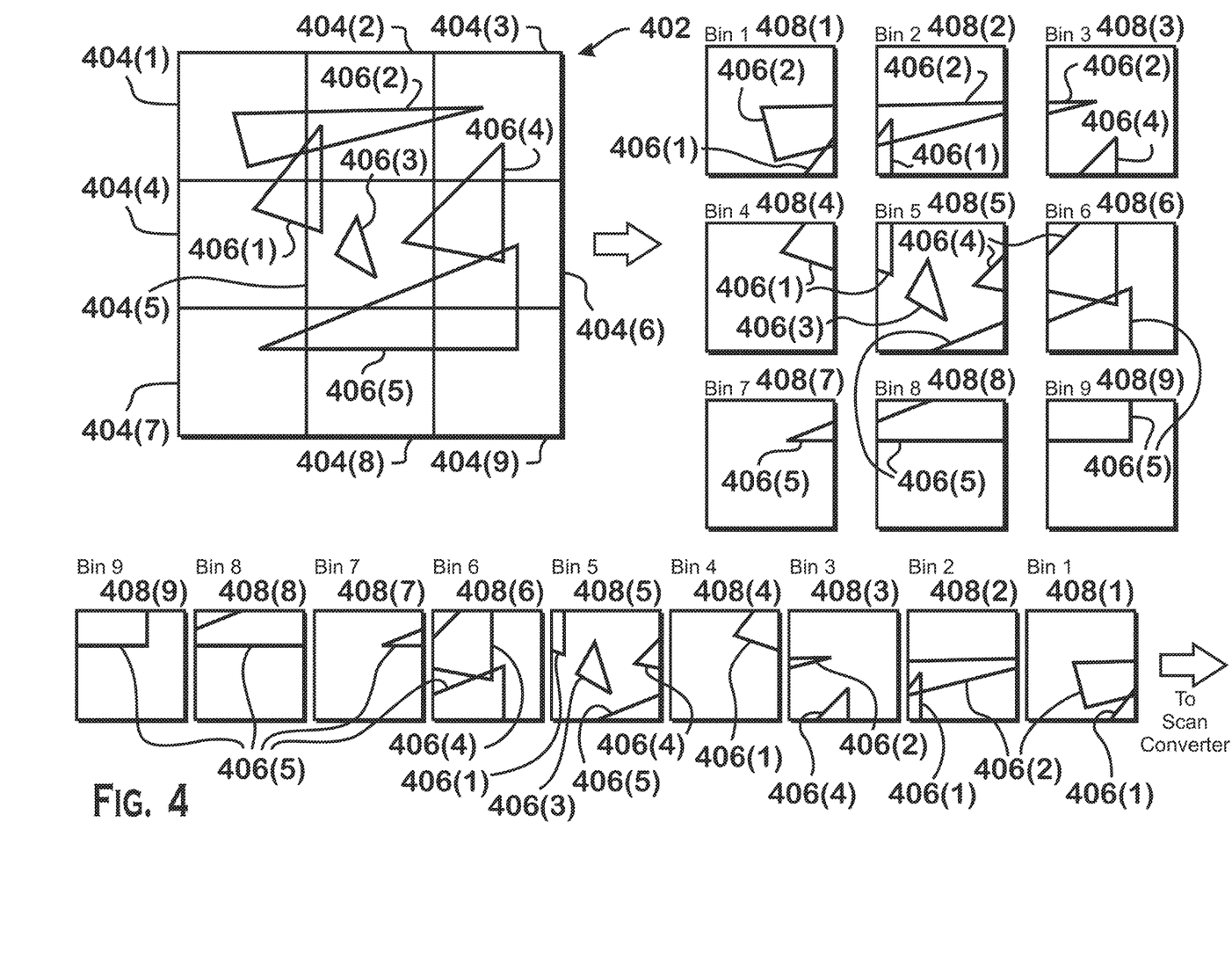
FIG. 4 is an illustration of operations performed by the binner of FIG. 3, according to an example.

FIG. 4 is an illustration of operations performed by the binner 304 of FIG. 3, according to an example. A screen-space 402 is illustrated, divided into several screen-space subdivisions 404. The screen-space 402 represents a geometric area in which pixels can be rendered for eventual output to a display device 118. Each screen-space subdivision 404 is a spatially distinct portion of the screen-space 402.

FIG. 4 illustrates five different primitives 406 received from the world-space pipeline 302. The different primitives 406 cover different screen-space subdivisions 404. The first primitive 406(1) covers screen-space subdivision 404(1), screen-space subdivision 404(2), screen-space subdivision 404(4), and screen-space subdivision 404(5). The second primitive 406(2) covers screen-space subdivision 404(1), screen-space subdivision 404(2), and screen-space subdivision 404(3). The third primitive 406(3) covers screen-space subdivision 404(5). The fourth primitive 406(4) covers screen-space subdivision 404(3), screen-space subdivision 404(5), and screen-space subdivision 404(6). The fifth primitive 406(5) covers screen-space subdivision 404(5), screen-space subdivision 404(6), screen-space subdivision 404(7), screen-space subdivision 404(8), and screen-space subdivision 404(9).

The binner 304 generates bins 1-9 (including bin 1 408(1), bin 2 408(2), and so on, through bin 9 408(9)). Each bin 408 includes the primitives 406 that cover the screen-space subdivision 404 associated with that particular bin. The bins 408 are transmitted in order to the remainder of the graphics processing pipeline 134 for processing. The specific order depicted is left to right and row, by row, although the order in which bins 408 are transmitted for processing can be any technically feasible order.

Although the primitives 406 are illustrated in FIG. 4 as being "cut off" by the boundary of the associated screen-space subdivision 404, the entire primitive is included in each particular bin. A clipping rectangle, aligned with the borders of the associated screen-space subdivision 404, is transmitted with each bin 408 to the remainder of the graphics processing pipeline 134 so that the remainder of the graphics processing pipeline 134 knows to process data for fragments within the screen-space subdivision 404 but not outside. The borders of the clipping rectangle can be modified for various operations that might require such modifications, such as anti-aliasing that uses data from adjacent pixels, or other operations.

The bins 408, along with the clipping rectangles, are processed by the remainder of the graphics processing pipeline 134 to render the primitives into pixels in bin-order. For example, 306 determines pixel coverage for the primitives in a first bin 408(1), a second bin 408(2), a third bin 408(3), and so on. The scan converter 306 rasterizes primitives for the first bin 408(1), primitives for the second bin 408(2), primitives for the third bin 408(3), and so on. As described above, rasterization involves identifying screen positions that are covered by a particular primitive. The clipping rectangle restricts the identified screen positions to only those included within the screen-space subdivision 404 associated with a particular bin 408. Thus, the output of the scan converter 306 for a particular bin 408 includes, for each primitive 406 in the bin 408, the fragments that are in the screen-space subdivision 404 associated with the bin 408 and are covered by that primitive 406. The output of the pixel shader 312 for a particular bin 408 includes, for each primitive 406, shaded fragments that cover that primitive 406 and are within the screen-space subdivision 404 associated with that bin 408.

Figure 5:
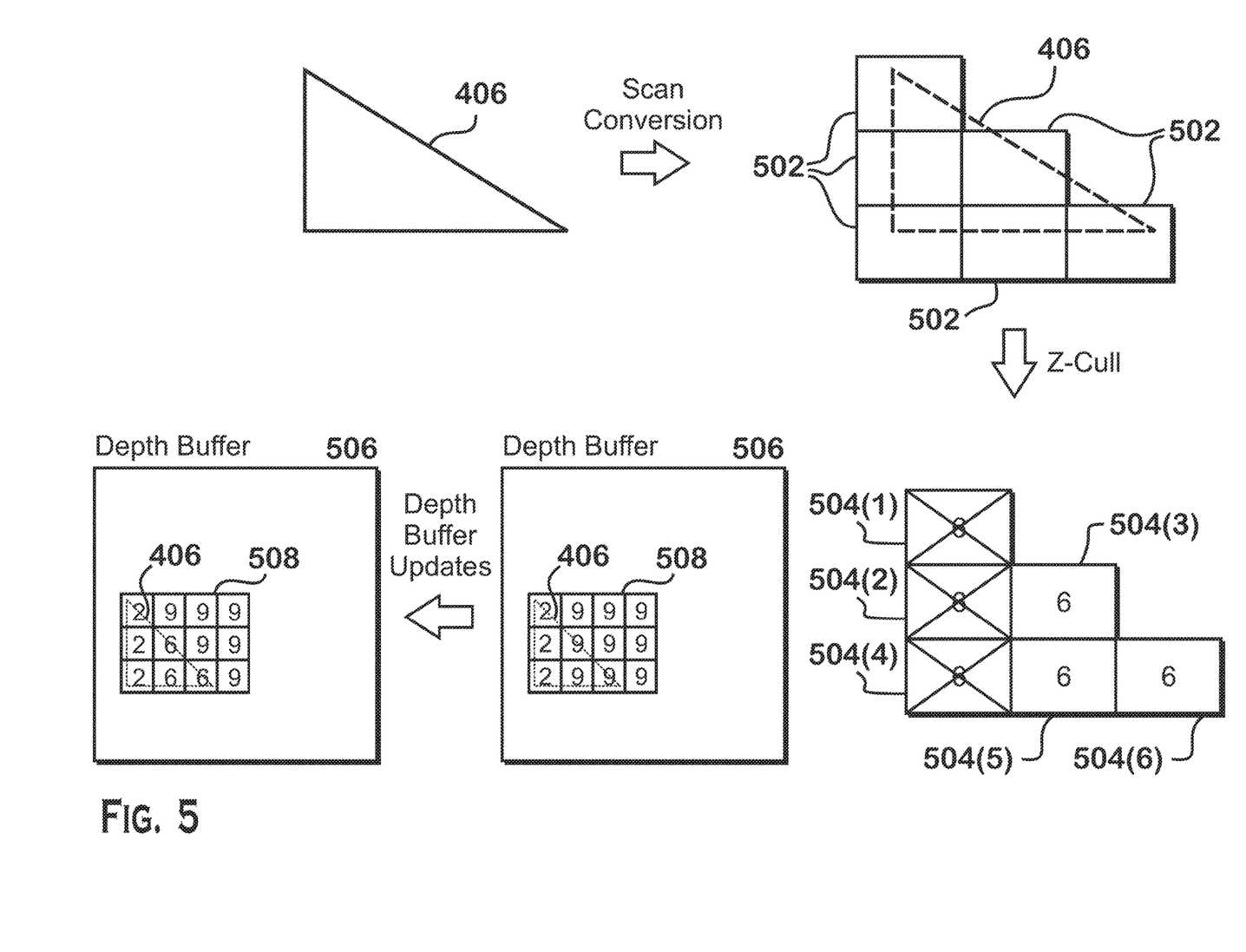
FIG. 5 is an illustration of operations performed by the scan converter of FIG. 3 and the z-cull unit of FIG. 3, according to an example.

FIG. 5 is an illustration of operations performed by the scan converter 306 of FIG. 3 and the z-cull unit 308 of FIG. 3, according to an example. The scan converter 306 receives primitives 406 as processed by the world-space pipeline 302 and binner 304 and performs scan conversion (also referred to as "rasterization"). Scan conversion involves identifying which screen positions 502 are covered by the primitive 406. Rules for determining whether a particular screen position 502 is covered by a particular primitive can vary and any technically feasible way to identify which screen position 502 are covered by a primitive 406 may be used. One example technique for determining whether a primitive covers a pixel is to determine whether the center point of the pixel is within the edges of the primitive. In this example, if the center point of the pixel is within the edges of the primitive, then the primitive is considered to cover that pixel. In this example, if the center point of the pixel is not within the edges of the primitive, then the primitive is considered to not cover that pixel. Any other technically feasible technique for determining whether a pixel is covered by a primitive can alternatively be used. In some situations the graphics processing pipeline 134 generates an image in the frame buffer 316 that includes multiple "samples" (e.g., color values) per screen pixel. A multi-sample image can be used for various tasks such as multi-sample anti-aliasing which generates a single color value for each screen pixel based on multiple samples generated for the pixel. In such situations, the scan converter 306 determines coverage for each sample within a pixel and outputs a fragment for each covered sample in the pixel. The scan converter 306 may also generate an output a coverage mask for each pixel, where the coverage mask indicates which samples in a pixel are covered by a primitive. The scan converter 306 outputs the fragments 504 covered by the primitive 406 for processing by the z-cull unit 308. In FIG. 5, six screen positions 502 are considered to be covered by the primitive 406.

Six fragments 504 (504(1) through 504(6)) that correspond to the six screen positions 502 are shown in FIG. 5. Each fragment 504 has a depth value illustrated as well, which is the number depicted within each fragment 504. The depth value for each fragment 504 is 6 in the example illustrated in FIG. 5, but in other examples, fragments for the same primitives can have different depth values.

To perform z-culling, the z-cull unit 308 compares the depth values for the received fragments 504 against depth values in a depth buffer 506. If the corresponding depth value in the depth buffer 506 indicates that the fragment 504 under consideration is occluded by a fragment already processed by the z-cull unit 308, then that fragment 504 is discarded. If the corresponding depth value in the depth buffer 506 indicates that the fragment 504 under consideration is not occluded by a fragment already processed by the z-cull unit 308, then that fragment 504 is passed through the z-cull unit 308 and the depth value in the depth buffer 506 is updated to match the depth value of the passed fragment 504.

Depth values in the depth buffer 506 are shown for a screen area 508 local to the primitive 406 but are omitted from other portions of the depth buffer 506 for simplicity and clarity. It should be understood, however, that the depth buffer 506 would store depth values for other areas of a screen.

The screen area 508 local to the primitive 406 shows twelve depth values, which are, in order from left to right and top to bottom, 2, 9, 9, 9, 2, 9, 9, 9, 2, 9, 9, and 9. The position of the fragments 504 generated based on the primitive 406 correspond to different depth values as illustrated by the location of the primitive 406 in the depth buffer 506. More specifically, the fragment 504(1) overlaps with the top-most depth value 2, the fragment 504(2) overlaps with the middle depth value 2, the fragment 504(4) overlaps with the bottom depth value 2, the fragment 504(3) overlaps with the left-middle depth value 9, the fragment 504(5) overlaps with the left-bottom depth value 9, and the fragment 504(6) overlaps with the bottom-middle depth value 9.

The z-cull unit 308 compares the depth values of the fragments 504 with the depth values overlapped by the fragments 504 in the depth buffer 506. If a depth value in the depth buffer 506 is lower than the depth value of an overlapping fragment 504 (and thus the associated fragment is closer to the camera than the overlapping fragment 504), then the overlapping fragment 504 is occluded by a fragment already processed by the z-cull unit 308. In that situation, the z-cull unit 308 discards the overlapping fragment. In FIG. 5, the left-most fragments 504 (fragment 504(1), fragment 504(2), and fragment 504(4)) have depth values of 6 and overlapping depth values in the depth buffer 506 are equal to 2. Thus, the z-cull unit 308 discards the left-most fragments 504 (this discarding is indicated with the "X's"). If a depth value in the depth buffer 506 is greater than the depth value of an overlapping fragment 504, then the overlapping fragment 504 is not occluded by any fragment 504 already processed by the z-cull unit 308. In this situation, the z-cull unit 308 does not discard the fragment 504 but instead updates the depth values stored in the depth buffer 506 with the depth values of the not-occluded fragment 504. In FIG. 5, the three depth values that correspond to fragment 504(3), fragment 504(5), and fragment 504(6) are updated. Thus, after the depth buffer updates, there are three depth values of 2, three depth values of 6, with the remaining depth values of 9.

In sum, the z-cull unit 308 maintains a depth buffer 506 that stores the lowest depth value of the fragments 504 that have been processed by the z-cull unit 308. Later fragments output from the z-cull unit 308 cannot be occluded by earlier fragments output from the z-cull unit 308. However, earlier fragments output from the z-cull unit 308 could potentially be occluded by fragments later processed by the z-cull unit 308. A particular "depth model" is described herein, in which a lower depth value means a fragment is closer to the camera than a higher depth value. However, it should be understood by those skilled in the art that the teachings provided herein are not limited to this particular "depth model" and that the teachings provided herein can be applied to any other technically feasible depth model. In one example, a higher depth value means that a fragment is closer to the camera than a fragment having a lower depth value. Any other technically feasible depth model is possible as well.

Figure 6:
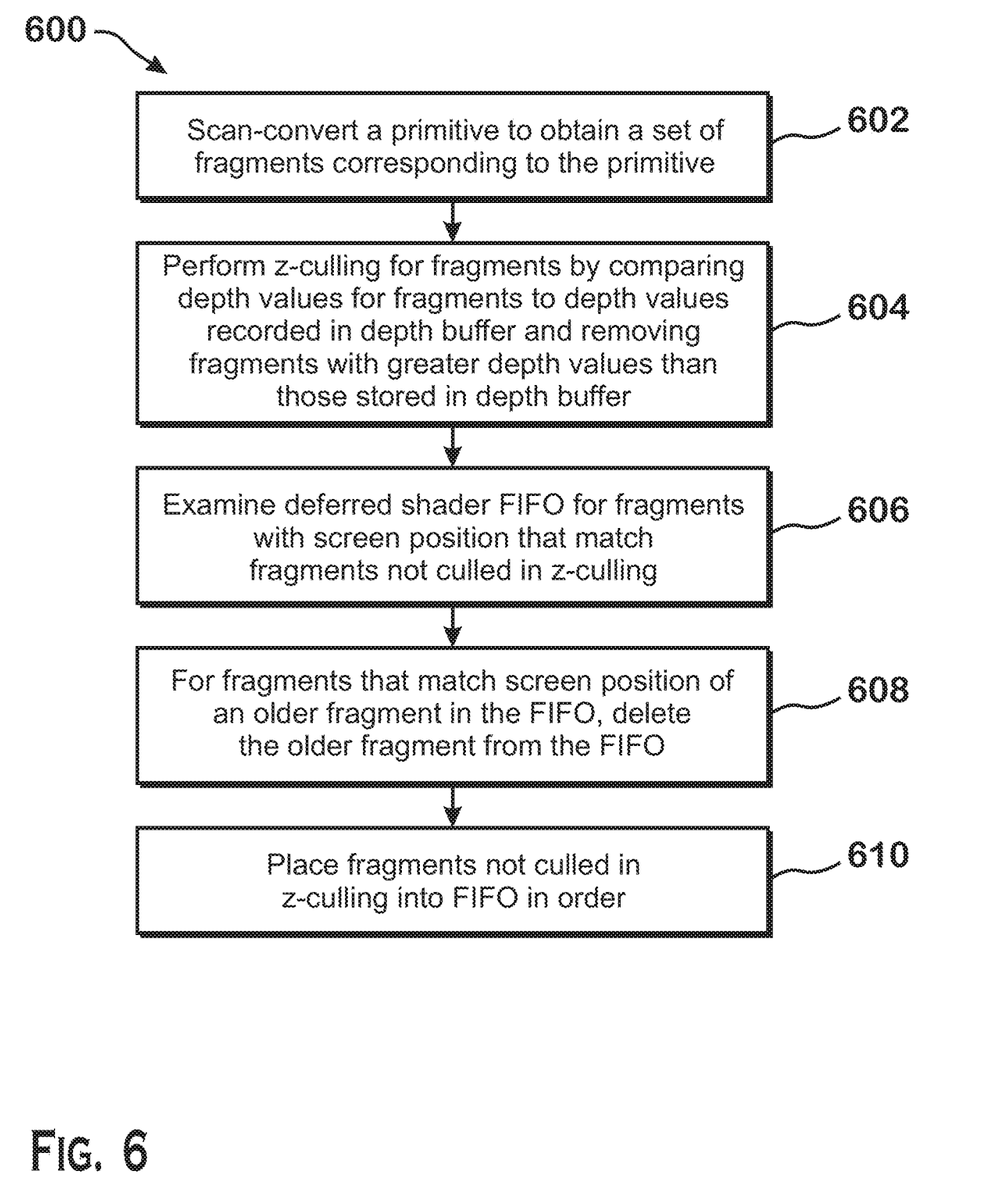
FIG. 6 is a flow diagram of a method for discarding fragments that are occluded by later-received fragments, according to an example.

For this reason, the deferred pixel shading unit 310 "holds" fragments output from the z-cull unit 308 to check for later fragments that occlude earlier fragments. FIG. 6 is a flow diagram of a method 600 for discarding fragments that are occluded by later-received fragments, according to an example. Although described with respect to the system shown and described with respect to FIGS. 1-5, it should be understood that any system configured to perform the method, in any technically feasible order, falls within the scope of the present disclosure.

As shown, the method 600 begins at step 602, where the scan converter 306 rasterizes a primitive to obtain a set of fragments corresponding to the primitive. Rasterization can be performed as described with respect to FIGS. 3 and 5. If binning is used, then the set of fragments obtained are the fragments corresponding to the primitive and within a particular screen-space subdivision 404. At step 604, the z-cull unit 308 receives the rasterized fragments from the scan converter 306 and performs z-culling on those fragments. Z-culling includes comparing the depth value of the received fragments to depth values stored in a depth buffer. Fragments that have a depth value greater than the corresponding value in the depth buffer are occluded by previously-processed fragments and are thus discarded. Fragments that have a depth value less than the corresponding value in the depth buffer are not occluded by previously-processed fragments. In that situation, the z-cull unit 308 updates the depth value in the depth buffer with the depth value of the fragment and passes the fragment to the deferred pixel shading unit 310.

At step 606, the deferred pixel shading unit 310 compares received fragments with fragments stored in a first-in-first-out ("FIFO") buffer that stores fragments previously processed by the deferred pixel shading unit 310. More specifically, the deferred pixel shading unit 310 determines whether the screen position of an incoming fragment matches the screen position of a fragment stored in the FIFO buffer. Binning improves the likelihood that a match will occur in the FIFO buffer because with binning, fragments for a small portion of screen space associated with a bin, and not fragments for other portions of the screen space, are processed together in the deferred pixel shading unit 310.

At step 608, for fragments having a screen position that matches the screen position of a fragment in the FIFO buffer, the deferred pixel shading unit 310 removes the oldest matching fragment from the FIFO buffer. If there is no screen position match between an incoming fragment and a fragment in the FIFO buffer, then the deferred pixel shading unit 310 does not discard any fragment from the FIFO buffer. At step 610, the deferred pixel shading unit 310 places received fragments into the FIFO buffer. The deferred pixel shading unit 310 places fragments into the FIFO buffer in this step regardless of whether such fragments match a fragment already in the FIFO buffer when compared at step 606.

The deferred pixel shading unit 310 continues to fill the FIFO until a flush condition is met, at which point, the deferred pixel shading unit 310 transmits the fragments in the FIFO to the pixel shader 312 for processing in the order indicated by the FIFO. The flush includes: 1) the FIFO is full; 2) the binner 304 indicates to the deferred pixel shading unit 310 that all primitives for a particular bin 408 have been transmitted by the binner 304; 3) the binner 304 indicates to the deferred pixel shading unit 310 that the current frame is finished and a next frame is to be processed, or 4) any other event indicating that a flush is to be performed for any reason, including a programmable flush condition set by the device driver 122 or an application 126.

The method 600 described above can be used to process fragments in the situation in which there is a single fragment per screen pixel or multiple fragments per screen pixel. Further, although a specific "depth model" is described with respect to step 604 (one in which lower depth values indicate fragments that are closer to the camera than higher depth values), other depth models may alternatively be used.

Figure 7:
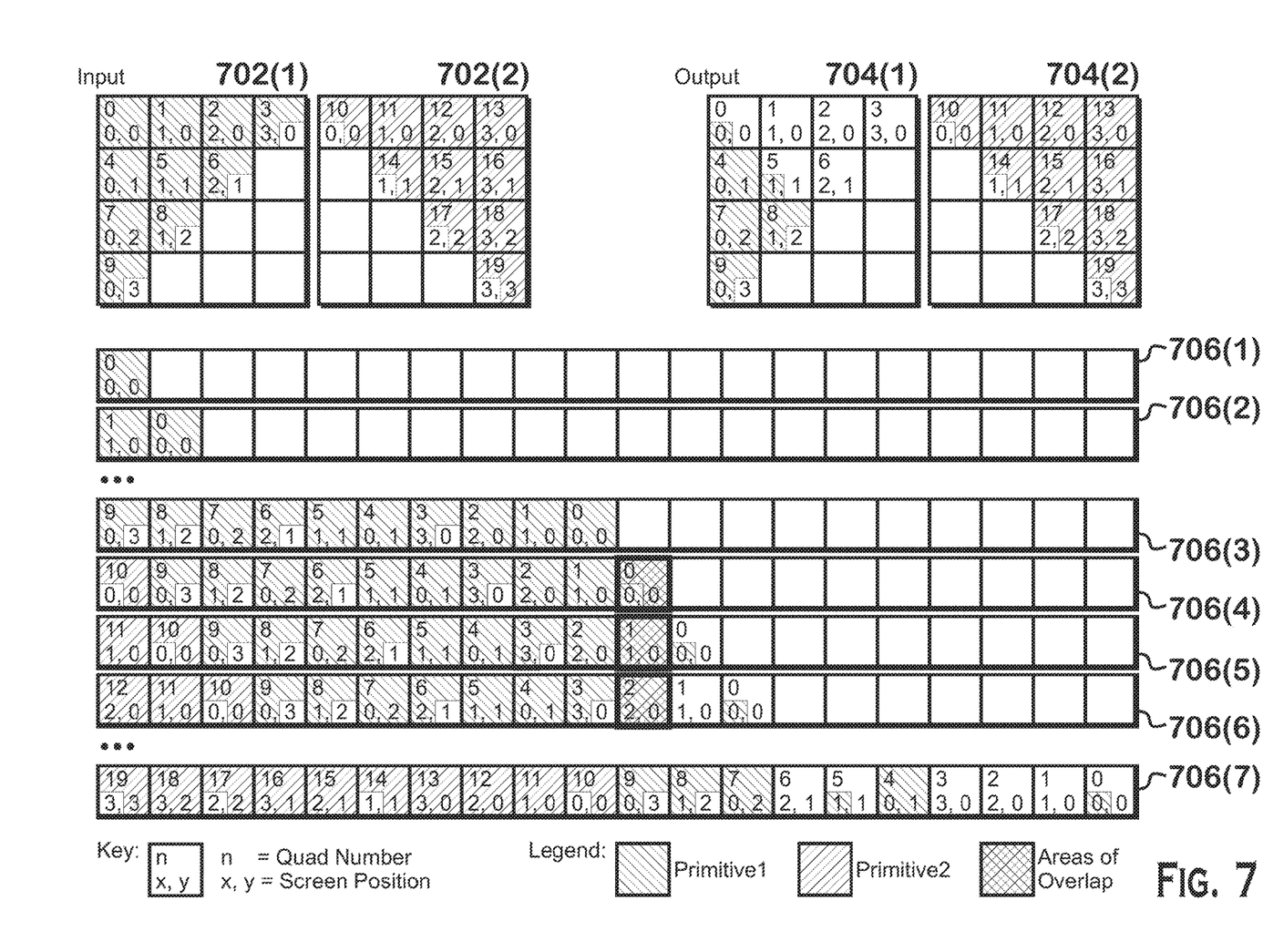
FIG. 7 illustrates example operations for discarding fragments that are occluded by later-received fragments, according to an example.

FIG. 7 illustrates example operations for discarding fragments that are occluded by later-received fragments, according to an example. FIG. 7 illustrates a first input primitive 702(1), input to the deferred pixel shading unit 310 before a second input primitive 702(2) is input to the deferred pixel shading unit 310. The first input primitive 702(1) includes quads 0 through 9 (where 0 through 9 are termed respective "quad identifiers"), with x and y screen position values as shown for the respective quads. The second input primitive 702(2) has quads 10 through 19 (where 10 through 19 are termed respective "quad identifiers"), also with x and y screen position values as shown. More specifically, the first input primitive 702(1) has quad 0 at position 0, 0, quad 1 at position 1, 0, quad 2 at position 2, 0, quad 3 at position 3, 0, quad 4 at position 0, 1, quad 5 at 1, 1, quad 6 at 2, 1, quad 7 at 0, 2, quad 8 at 1, 2, and quad 9 at 0, 2. The second input primitive 702(2) has quad 10 at position 0, 0, quad 11 at position 1, 0, quad 12 at position 2, 0, quad 13 at 3, 0, quad 14 at position 1, 1, quad 15 at position 2, 1, quad 16 at position 3, 1, quad 17 at position 2, 2, quad 18 at position 3, 2, and quad 19 at position 3, 3. The coverage for each quad is indicated graphically. Covered pixels in a quad are illustrated with a particular hatching and non-covered pixels have no hatching. For example, in quad 3, there is coverage in a top-left pixel, a top-right pixel, and a bottom-left pixel, but not a bottom-right pixel. Quads are illustrated in FIG. 7, instead of individual fragments, to illustrate the interplay between coverage masks and the operations of the deferred pixel shading unit 310.

First-in-first-out ("FIFO") buffer states 706 illustrate states of a FIFO buffer (illustrated as a row of 20 boxes, with each box corresponding to a different FIFO buffer entry) and how the FIFO buffer changes as quads are received at the deferred pixel shading unit 310. The FIFO buffer includes FIFO entries that store data about quads received from the z-cull unit 308. The purpose of the FIFO buffer is to allow the screen position of incoming quads to be checked against the screen positions of older quads stored in the FIFO buffer to determine whether an older quad or portion thereof should be discarded due to being occluded by the newer quad. As described above, the z-cull unit 308 guarantees that later-processed fragments are not occluded by earlier-processed fragments. Thus, for a later-processed fragment in the same screen position as an earlier-processed fragment, the later-processed fragment occludes the earlier-processed fragment, which is therefore discarded.

Each time a new quad is received, the deferred pixel shading unit 310 checks the screen position of that quad against the screen positions of all quads in the FIFO buffer. If a match does not occur (a match occurs if the screen position of a quad in the FIFO buffer is the same as the screen position of the received quad), then the deferred pixel shading unit 310 makes no changes to the quads already stored in the FIFO buffer. If a match does occur, and the new quad has at least one fragment that is covered and that overlaps with a covered fragment of the matching quad in the FIFO buffer, then the deferred pixel shading unit 310 updates the FIFO buffer to eliminate fragments in the FIFO buffer that are overlapped by the at least one fragment of the incoming quad. Regardless of whether a match occurs, the deferred pixel shading unit 310 shifts the quads down (to the right in FIG. 7) by one and stores the new quad in the FIFO buffer, at an end of the FIFO buffer corresponding to the "newest entries" (the left-most end of the FIFO buffer in FIG. 7).

The first FIFO buffer state 706(1) illustrates the state of the FIFO buffer after receiving quad 0 of the first input primitive 702(1). The second FIFO buffer state 706(2) illustrates the state of the FIFO buffer after receiving quad 1 of the first input primitive 702(1). Skipping ahead, the third FIFO buffer state 706(3) shows all quads of the first input primitive 702(1) in the FIFO buffer. After all quads of the first input primitive 702(1) are input to the FIFO buffer, the deferred pixel shading unit 310 processes quads of the second input primitive 702(2). The fact that the quads of the second input primitive 702(2) are processed after the quads of the first input primitive 702(1) is due to the fact that the scan converter 306 outputs the quads in this order. This particular ordering may be a result of the fact that the scan converter 306 first processes the first input primitive 702(1) and then processes the second input primitive 702(2), and therefore sends the quads for the first input primitive 702(1) to the deferred pixel shading unit 310 before the quads for the second input primitive 702(2). Because z-culling is performed after rasterization but before the operations of the deferred pixel shading unit 310, each fragment of the later-received primitive (the second input primitive 702(2)) is guaranteed to not be occluded by any fragment of the earlier-received primitive (the first input primitive 702(1)).

After the third FIFO buffer state 706(3), the deferred pixel shading unit 310 receives quad 10 and checks quad 10 against the quads in the FIFO buffer. The deferred pixel shading unit 310 determines that quad 0 has the same screen position as quad 10. This conflict is indicated in the fourth FIFO buffer state 706(4) with a bold rectangle around quad 0. In this situation, the deferred pixel shading unit 310 modifies or eliminates the older conflicting quad in the FIFO buffer, which is quad 0. The modification or elimination is based on the degree to which there is overlapping coverage in the older and newer conflicting quad. More specifically, if a new quad has the same screen position as a quad already in the FIFO buffer, then the deferred pixel shading unit 310 determines the degree of overlap between the coverage of the new quad and the coverage of the old quad. If there is partial overlap, then the old quad is updated so that the portion of the old quad overlapped by the new quad is removed from the FIFO buffer. Partial overlap means that the old quad covers at least some, but not all, of the quad that is covered by the new quad. If there is full overlap then the deferred pixel shading unit 310 removes the old quad from the FIFO buffer. Full overlap means that the old quad is covered entirely by the new quad (i.e., all portions of the quad indicated as being covered by the old quad are covered by the new quad). If there is no overlap, then the deferred pixel shading unit 310 makes no change to the old quad in the FIFO buffer. No overlap means that no portion of the quad indicated as being covered by the old quad is covered by the new quad.

Quad 10 is in the same screen position as quad 0. However, quad 0 covers the entire area of the screen position, while quad 10 only covers the top-right portion. In this situation, the deferred pixel shading unit 310 determines that quad 0 is partially overlapped by quad 10 and thus modifies quad 0 in the FIFO buffer to remove the overlapped portion. Thus, at state 706(5), quad 0 is shown as only including the bottom-left portion but not the top-right portion, which has been removed.

Also at state 706(5), the deferred pixel shading unit 310 determines that quad 11 has the same screen position as another quad in the FIFO buffer: quad 1 (both quads have screen position 1, 0). In response, the deferred pixel shading unit 310 determines what portion of quad 1 is covered by quad 11. Because quad 11 fully overlaps quad 1, the deferred pixel shading unit 310 removes quad 1 from the FIFO buffer. Thus, in state 706(6), quad 1 is shown as having no coverage, indicating that quad 1 is an "empty" quad and should not be forwarded to the pixel shader 312. In the example implementation shown, the empty quads are maintained in the FIFO buffer instead of freeing the slot occupied by the empty quad, but in alternate implementations, the slot could be freed and non-empty quads could be shifted towards the freed slot. In state 706(6), the deferred pixel shading unit 310 determines that quad 12 fully overlaps quad 2 and thus removes quad 2 from the FIFO buffer.

Jumping ahead, FIFO buffer state 706(7) illustrates a FIFO buffer after processing the quads of input primitive 702(1) and input primitive 702(2). Quad 0, overlapped partially by later quad 10, has only the non-overlapping portion remaining. Quads 1, 2, and 3 are fully overlapped by quads 11, 12, and 13, and are thus removed from the FIFO buffer. Quad 4 is not covered by a later quad shown, and thus remains in the FIFO buffer. Quad 5 is partially overlapped by quad 14 and thus only the non-overlapped portion remains in the FIFO buffer. Quad 6 is fully overlapped by quad 15 and is thus removed from the FIFO buffer. Quads 7, 8, and 9 are not overlapped by subsequent quads and are thus unmodified in the FIFO buffer. Similarly, all quads of input primitive 702(2) are not overlapped by any other quad and are thus unmodified in the FIFO buffer.

The contents of the FIFO buffer are transmitted to the rest of the pipeline for processing and produce output primitive 704(1) and output primitive 704(2) in the frame buffer 316 (assuming no later primitives that overlap output primitive 704(1) or output primitive 704(2) are processed). Output primitive 704(1) is clipped by output primitive 704(2) as shown. The pixel shader 312 does not process the clipped portions of the primitives because those clipped portions are removed from the FIFO buffer prior to being sent to the pixel shader 312.

The above discussion is an example in which there is one sample per pixel. However, the techniques discussed above can be applied to situations in which each pixel has multiple samples.

One modification to the above techniques involves marking fragments as overlapping, instead of deleting those fragments. More specifically, when a match occurs between an incoming quad and a quad in the FIFO buffer, and the deferred pixel shading unit 310 determines that there is an overlap in coverage between the two quads, the deferred pixel shading unit 310 marks the overlapping fragment(s) of both quads as being overlapped. The pixel shader 312 subsequently uses this overlap information to ensure that older overlapping fragments are processed before newer overlapping fragments. The pixel shader 312 can use a barrier operation to cause operations in the pixel shader 312 to wait until after the older fragment is processed before processing the newer, overlapping fragment. This "marking" mode of operation can be used when transparency is switched on. With transparency on, a fragment that overlaps another fragment does not simply overwrite that fragment but can be blended with that fragment in a blending operation. In such situations, instead of removing the oldest matching fragment in the FIFO buffer, each fragment that matches in the FIFO buffer is marked as being an overlapping. One other alternative when transparency is turned on is to bypass the FIFO buffer. In such situations, the deferred pixel shading unit 310 is effectively switched off or bypassed. Fragments are not placed into the FIFO buffer and no checks are made to determine whether incoming fragments match fragments stored in the FIFO buffer.

Although the FIFO buffer is illustrated in FIG. 7 as storing entries corresponding to quads, entries may instead correspond to individual pixels or to groups of pixels larger than 2×2. With entries that correspond to individual pixels, coverage is not checked if a screen-position match occurs between an input pixel and a pixel in the FIFO buffer. Instead, if such a match occurs, the entry is simply deleted from the FIFO. With individual FIFO buffer entries corresponding to groups of pixels larger than 2×2, coverage checking is performed in a similar manner as in the description above except that coverage checking is performed at a finer grain.

The APD 116 may include multiple different FIFO buffers operating in parallel, each of which is assigned a different portion of screen space. The sequence of fragments processed and output by various units in the graphics processing pipeline 134 may be referred to herein as a "stream."

The fact that binning is performed allows the FIFO buffer to be of relatively small size and/or improves the hit rate of the FIFO buffer. More specifically, because the FIFO buffer is emptied after receiving all fragments for a particular bin, it is contemplated that the FIFO buffer will store only fragments that fall in a particular bin at any particular time. Thus there is a greater chance of a "hit" in the FIFO buffer than if fragments at any screen position could be stored in the FIFO buffer. This increased hit rate improves the rate at which occluded fragments are removed, which decreases the amount of unnecessary work performed by the pixel shader 312.

A method for identifying overlapping fragments in a stream of fragments for processing by a pixel shader is provided. The method includes receiving, from a stream of z-culled fragments, a first fragment, the first fragment having a first screen position. The method also includes identifying, in a deferred pixel shading buffer that stores fragments, a second fragment having a second screen position that matches the first screen position. The method further includes, responsive to the identifying, modifying the deferred pixel shading buffer based on the match. The method also includes transmitting the fragments of the deferred pixel shading buffer to a pixel shader for shading.

An accelerated processing device is also provided. The accelerated processing device includes a z-cull unit configured to z-cull fragments of a set of fragments to generate a stream of z-culled fragments. The accelerated processing device also includes a pixel shader configured to perform pixel shading operations on fragments provided to the pixel shader. The accelerated processing device further includes a deferred pixel shading unit. The deferred pixel shading unit is configured to receive, from the stream of z-culled fragments, a first fragment, the first fragment having a first screen position. The deferred pixel shading unit is also configured to identify, in a deferred pixel shading buffer that stores fragments, a second fragment having a second screen position that matches the first screen position. The deferred pixel shading unit is further configured to, responsive to the identifying, modify the deferred pixel shading buffer based on the match. The deferred pixel shading unit is also configured to transmit the fragments of the deferred pixel shading buffer to the pixel shader for shading.

A non-transitory computer-readable medium storing instructions that, when executed by a processor, cause the processor to perform a method for identifying overlapping fragments in a stream of fragments for processing by a pixel shader is provided. The method includes receiving, from a stream of z-culled fragments, a first fragment, the first fragment having a first screen position. The method also includes identifying, in a deferred pixel shading buffer that stores fragments, a second fragment having a second screen position that matches the first screen position. The method further includes responsive to the identifying, modifying the deferred pixel shading buffer based on the match. The method also includes transmitting the fragments of the deferred pixel shading buffer to a pixel shader for shading.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for identifying overlapping fragments in a stream of fragments for processing by a pixel shader, the method comprising:
   receiving, from a stream of z-culled fragments, a new fragment incoming into a deferred pixel shading buffer that stores fragments, the new fragment having a first screen position;
   identifying, in the deferred pixel shading buffer, an existing fragment having a second screen position that matches the first screen position of the new fragment incoming into the deferred pixel shading buffer;
   responsive to the identifying, and without additionally comparing depth for the existing fragment to depth of the new fragment, modifying the deferred pixel shading buffer based on the match, the modifying including either marking both the existing fragment and the new fragment as being overlapped, or discarding the existing fragment from the deferred pixel shading buffer;
   storing the new fragment into the deferred pixel shading buffer; and
   transmitting the stored fragments of the deferred pixel shading buffer to a pixel shader for shading.

2. The method of claim 1, further comprising:
   binning a plurality of input primitives to generate a plurality of binned input primitives;
   rasterizing the plurality of binned input primitives to generate a set of fragments; and
   z-culling the set of fragments to produce the stream of z-culled fragments.

3. The method of claim 2, wherein:
   binning the plurality of input primitives to generate the plurality of binned input primitives includes assigning the primitives of the plurality of input primitives to bins, where each bin is associated with a different portion of screen space, and
   the plurality of binned input primitives comprises primitives of the plurality of input primitives that are ordered based on the portion of screen space overlapped by the primitives of the plurality of input primitives.

4. The method of claim 2, wherein z-culling the set of fragments comprises:
   for each fragment in the set of fragments, determining whether a depth buffer stores a depth value that indicates that the fragment is occluded; and
   if the fragment is occluded, then discarding the fragment, and
   if the fragment is not occluded, then updating the depth value to be equal to a depth value of the fragment.

5. The method of claim 2, wherein rasterizing the plurality of binned input primitives to generate the set of fragments comprises:
   for each input primitive, identifying screen positions covered by the input primitive and generating fragments for the covered screen positions, wherein the generated fragments are included within the set of fragments generated by the rasterizer and z-culled to produce the stream of z-culled fragments.

6. The method of claim 1, wherein:
   transmitting the fragments of the deferred pixel shading buffer to the pixel shader for shading is done responsive to one or more of detecting that fragments corresponding to all primitives for a bin have been received at the deferred pixel shading buffer, detecting that all primitives for a frame have been received at the deferred pixel shading buffer, and detecting that the deferred pixel shading buffer is full.

7. The method of claim 1, wherein:
the deferred pixel shading buffer is associated with a first portion of screen space; and
the method further comprises performing the receiving, identifying, modifying, and transmitting steps for a second deferred pixel shading buffer that is associated with a second portion of the screen space.

8. The method of claim 1, wherein modifying the deferred pixel shading buffer based on the match comprises discarding the existing fragment from the deferred pixel shading buffer.

9. An accelerated processing device ("APD") comprising:
a z-cull unit configured to z-cull fragments of a set of fragments to generate a stream of z-culled fragments;
a pixel shader configured to perform pixel shading operations on fragments provided to the pixel shader; and
a deferred pixel shading unit configured to:
receive, from the stream of z-culled fragments, a new fragment incoming into a deferred pixel shading buffer that stores fragments, the new fragment having a first screen position,
identify, in the deferred pixel shading buffer, an existing fragment having a second screen position that matches the first screen position of the new fragment incoming into the deferred pixel shading buffer,
responsive to the identifying, and without additionally comparing depth for the existing fragment to depth of the new fragment, modify the deferred pixel shading buffer based on the match, the modifying including either marking both the existing fragment and the new fragment as being overlapped, or discarding the existing fragment from the deferred pixel shading buffer,
store the new fragment into the deferred pixel shading buffer, and
transmit the fragments of the deferred pixel shading buffer to the pixel shader for shading.

10. The APD of claim 9, further comprising:
a binner configured to bin a plurality of input primitives to generate a plurality of binned input primitives; and
a scan converter configured to rasterize the plurality of binned input primitives to generate the set of fragments.

11. The APD of claim 10, wherein:
binning the plurality of input primitives to generate the plurality of binned input primitives includes assigning the primitives of the plurality of input primitives to bins, where each bin is associated with a different portion of screen space, and
the plurality of binned input primitives comprises primitives of the plurality of input primitives that are ordered based on the portion of screen space overlapped by the primitives of the plurality of input primitives.

12. The APD of claim 10, wherein the z-cull unit is configured to z-cull the fragments of the set of fragments by:
for each fragment in the set of fragments, determining whether a depth buffer stores a depth value that indicates that the fragment is occluded; and
if the fragment is occluded, then discarding the fragment, and
if the fragment is not occluded, then updating the depth value to be equal to a depth value of the fragment.

13. The APD of claim 10, wherein the scan converter is configured to rasterize the plurality of binned input primitives to generate the set of fragments by:
for each input primitive, identifying screen positions covered by the input primitive and generating fragments for the covered screen positions, wherein the generated fragments are included within the set of fragments generated by the rasterizer and z-culled to produce the stream of z-culled fragments.

14. The APD of claim 9, wherein modifying the deferred pixel shading buffer based on the match comprises:
removing the existing fragment from the deferred pixel shading buffer.

15. The APD of claim 9, wherein the deferred pixel shading unit is configured to transmit the fragments of the deferred pixel shading buffer to the pixel shader for shading responsive to one or more of detecting that fragments corresponding to all primitives for a bin have been received at the deferred pixel shading buffer, detecting that all primitives for a frame have been received at the deferred pixel shading buffer, and detecting that the deferred pixel shading buffer is full.

16. A non-transitory computer-readable medium storing instructions that, when executed by a processor, cause the processor to perform a method for identifying overlapping fragments in a stream of fragments for processing by a pixel shader, the method comprising:
receiving, from a stream of z-culled fragments, a new fragment incoming into a deferred pixel shading buffer that stores fragments, the new fragment having a first screen position;
identifying, in the deferred pixel shading buffer, an existing fragment having a second screen position that matches the first screen position of the new fragment incoming into the deferred pixel shading buffer;
responsive to the identifying, and without additionally comparing depth for the existing fragment to depth of the new fragment, modifying the deferred pixel shading buffer based on the match, the modifying including either marking both the existing fragment and the new fragment as being overlapped, or discarding the existing fragment from the deferred pixel shading buffer;
storing the new fragment into the deferred pixel shading buffer; and
transmitting the stored fragments of the deferred pixel shading buffer to a pixel shader for shading.

17. The non-transitory computer-readable medium of claim 16, wherein the method further comprises:
binning a plurality of input primitives to generate a plurality of binned input primitives;
rasterizing the plurality of binned input primitives to generate a set of fragments; and
z-culling the set of fragments to produce the stream of z-culled fragments.

18. The non-transitory computer-readable medium of claim 16, wherein:
transmitting the fragments of the deferred pixel shading buffer to the pixel shader for shading is done responsive to one or more of detecting that fragments corresponding to all primitives for a bin have been received at the deferred pixel shading buffer, detecting that all primitives for a frame have been received at the deferred pixel shading buffer, and detecting that the deferred pixel shading buffer is full.

19. The non-transitory computer-readable medium of claim 16, wherein modifying the deferred pixel shading buffer based on the match comprises discarding the existing fragment from the deferred pixel shading buffer.

\* \* \* \* \*